(12) United States Patent
Spengler et al.

(10) Patent No.: US 8,517,725 B2
(45) Date of Patent: Aug. 27, 2013

(54) CERAMIC BURNER

(75) Inventors: Alois Spengler, Sosberg (DE);
Friedrich Eschmann, Bischofsheim (DE); Franz Dachs, Mainz (DE);
Teodor Krone, Bad Schwalbach (DE)

(73) Assignee: Paul Wurth Refractory & Engineering GmbH (DE)

( * ) Notice: Subject to any disclaimer, the term of this patent is extended or adjusted under 35 U.S.C. 154(b) by 817 days.

(21) Appl. No.: 12/597,201

(22) PCT Filed: Apr. 30, 2008

(86) PCT No.: PCT/EP2008/055360
§ 371 (c)(1),
(2), (4) Date: Oct. 23, 2009

(87) PCT Pub. No.: WO2008/135506
PCT Pub. Date: Nov. 13, 2008

(65) Prior Publication Data
US 2010/0086888 A1 Apr. 8, 2010

(30) Foreign Application Priority Data
May 7, 2007 (EP) .................................. 07107651

(51) Int. Cl.
*C21B 9/00* (2006.01)
(52) U.S. Cl.
USPC .......................................... 432/217; 431/159
(58) Field of Classification Search
USPC ................. 432/216, 217; 431/162, 164, 165, 431/166, 159, 326, 328
See application file for complete search history.

(56) References Cited

U.S. PATENT DOCUMENTS

| 499,362 | A | | 6/1893 | Kampf | |
|---|---|---|---|---|---|
| 3,690,627 | A | * | 9/1972 | Van Herk et al. | 432/217 |
| 4,086,052 | A | | 4/1978 | Laux et al. | |
| 4,169,700 | A | * | 10/1979 | Yoshioka et al. | 431/174 |
| 4,313,724 | A | * | 2/1982 | Muller et al. | 432/217 |
| 4,353,688 | A | * | 10/1982 | Ahner et al. | 432/217 |
| 4,369,954 | A | * | 1/1983 | Palz | 266/139 |
| 4,470,800 | A | * | 9/1984 | Wolf | 431/285 |
| 4,986,749 | A | * | 1/1991 | Praat et al. | 432/28 |
| 5,433,599 | A | * | 7/1995 | Van Laar et al. | 431/181 |
| 2008/0199820 | A1 | * | 8/2008 | Cellissen et al. | 432/28 |
| 2010/0326621 | A1 | * | 12/2010 | Klima | 165/9.1 |

FOREIGN PATENT DOCUMENTS
WO 9926020 A1 5/1999

OTHER PUBLICATIONS
International Search Report PCT/EP2008/055360; Dated Oct. 10, 2008.

\* cited by examiner

*Primary Examiner* — Gregory A Wilson
(74) *Attorney, Agent, or Firm* — Cantor Colburn LLP

(57) ABSTRACT

A ceramic burner for use in a combustion chamber of a regenerative heat generator, such as a hot blast stove of a blast furnace, the ceramic burner including a burner feed chamber with a partition wall for dividing the burner feed chamber into a fuel chamber and an air chamber, where the fuel chamber has a fuel inlet for receiving combustible fuel and a fuel outlet for feeding the combustible fuel to a mixing zone (34), the air chamber having an air inlet for receiving combustion air and an air outlet for feeding the combustion air to the mixing zone, where the ceramic burner further includes a gastight metallic fuel container arranged in the burner feed chamber, the fuel container including the fuel chamber therein, a wall portion of the fuel container forming the partition wall between the fuel chamber and the air chamber.

17 Claims, 3 Drawing Sheets

CERAMIC BURNER

TECHNICAL FIELD

The present invention relates to a ceramic burner for use in a combustion chamber of a regenerative heat generator, such as a hot blast stove of a blast furnace.

BRIEF DISCUSSION OF RELATED ART

The preheating of air for blast furnaces is conventionally carried out in adjacent regenerative heaters known as hot blast stoves. Such stoves generally comprise a combustion chamber and a heat-retention shaft. In case of an internal combustion chamber stove, the combustion chamber and the heat-retention shaft are separated from one another by a wall constructed from refractory bricks. In case of the use of a ceramic burner, such a ceramic burner is located in a bottom section of the combustion chamber. Combustion air and combustible fuel, generally combustible gases, are supplied to the ceramic burner and a mixture of the combustion air and fuel is burned in the combustion chamber. The flue gases emanating from the combustion rise upwards in the combustion chamber, are diverted via a cupola and then pass through the heat-retention shaft filled with checker bricks. Heat from the flue gases is absorbed by the checker bricks. The flue gasses which have now cooled down escape the stove via an exhaust gas chamber and at least one discharge port.

Once the checker bricks have been heated to a sufficient temperature, the supply of combustion air and fuel is discontinued and air is blown through the stove in the opposite direction. The air is heated as it passes through the heat-retention shaft containing the hot checker bricks, diverted via a cupola into the combustion chamber, where it leaves the stove via a hot blast outlet in the shell of the stove to be fed to the blast furnace.

The ceramic burner generally comprises a fuel chamber for feeding the combustible fuel supplied to the ceramic burner to a mixing region and an air chamber for feeding the combustion air supplied to the ceramic burner to the mixing region. The fuel and air chambers are usually separated from each other by means of a partition constructed from refractory bricks. At the outlet end of the ceramic burner, the combustible fuel and the combustion air are mixed in the mixing region to form a combustible mixture.

In order to obtain a good efficiency of the installation, it is important that the combustion components are burnt as completely as possible before the hot flue gas flows through the heat-retention shaft. A lot of effort has gone into the design of the outlet end of the ceramic burner so as to ensure good efficiency.

However, one problem associated with such ceramic burners, is the fact that, because the ceramic burners are exposed to high temperatures and high temperature differences, the refractory bricks contract and expand. With time, this causes damage to the brick walls and reduced the lifetime of the ceramic burner.

Another problem is the combustible fuel, e.g. CO gas, leaking out of the fuel chamber and causing a high concentration of CO in the exhaust gasses. This problem is particularly present in stoves where the burner feed chamber and the exhaust gas chamber are arranged next to each other in the bottom section of the stove, with only a separation of refractory bricks between them. Due to the porosity of the refractory bricks, such a separation of refractory bricks can never be fully gastight. Leakage of fuel out of the fuel chamber, e.g. into the exhaust gas chamber, is accentuated by the ageing brick walls. The leakage of CO gas into the exhaust gas chamber and hence into the exhaust fumes causes the CO concentration to be too high.

Furthermore, a crossover of fuel or air between the fuel or air chambers in the burner feed chamber causes a premature mixing, which may lead to an undesired and premature burning of the mixture.

A crossover from the fuel chamber into the air chamber, and vice versa, may cause uncontrolled damage to the refractory design and accelerate the destruction of the refractory bricks.

U.S. Pat. No. 4,997,362 discloses a gas tight metallic fuel container arranged in the burner feed chamber, the fuel container comprising the fuel chamber therein, a wall portion of the fuel container forming the partition wall between the fuel chamber and the air chamber, thereby avoiding a crossover from the fuel chamber into the air chamber, and vice versa.

BRIEF SUMMARY OF THE INVENTION

The invention provides an improved ceramic burner for use in a combustion chamber of a regenerative heat generator, such as a hot blast stove.

The invention proposes a ceramic burner for use in a combustion chamber of a regenerative heat generator, such as a hot blast stove of a blast furnace, wherein the ceramic burner comprises a burner feed chamber with a partition wall for dividing the burner feed chamber into a fuel chamber and an air chamber. The fuel chamber has a fuel inlet for receiving combustible fuel and a fuel outlet for feeding the combustible fuel to a mixing zone. The air chamber has an air inlet for receiving combustion air and an air outlet for feeding the combustion air to the mixing zone. The ceramic burner further comprises a gastight metallic fuel container arranged in the burner feed chamber, the fuel container comprising the fuel chamber therein, a wall portion of the fuel container forming the partition wall between the fuel chamber and the air chamber.

The gastight metallic fuel container effectively prevents that the contents of fuel chamber leaks into the air chamber, thereby avoiding a premature mixing thereof. Also, the metallic fuel container is only insignificantly influenced by the ageing of the installation. The metallic partition wall does not deteriorate in such as way as to allow fuel to pass therethrough. The ceramic burner according to the present invention and the regenerative heat generator comprising such a ceramic burner therefore have a prolonged life.

The gastight metallic fuel container allows for the fuel chamber to be effectively isolated from the air chamber within the burner feed chamber and from the exhaust gas chamber. The burner feed chamber is divided into fuel and air chambers, simply by installing the fuel container therein. The fuel chamber is defined as being the space inside the fuel container and the air chamber is defined as being the space outside the fuel container. More importantly, the gastight metallic fuel container prevents any leakages of combustible fuel, such as CO rich gas, from the fuel chamber into the exhaust gas chamber. The CO content of the exhaust fumes is thereby not unnecessarily high.

According to the invention, the partition wall is undulated in a direction perpendicular to the fuel flow towards the mixing zone. The undulated partition wall preferably forms fuel channels inside the fuel container and air channels outside the fuel container, the alternating fuel channels and air channels leading the combustible fuel and the combustion air to the mixing zone. The undulated configuration of the partition wall allows for the fuel and air to reach into the respective other chamber, while still avoiding their mixing. In the region of the partition wall, the fuel and the air are guided towards the mixing zone in alternate fuel and air channels opening up into the mixing zone. At the outlets of the fuel and air chambers, the fuel and air are already premixed on entry into the mixing zone. This provides for an improved mixing of the fuel and the air in the mixing zone and hence for a better combustible mixture.

According to one aspect of the invention, the fuel container is suspended from a metallic construction resting on a support rim of the combustion chamber. Such a suspended arrangement of the fuel container in the burner feed chamber allows to prolong the lifetime of the fuel container and hence of the ceramic burner. Indeed, as the fuel container is exposed to expansion and/or compression effects with respect to the burner feed chamber, the fuel container itself is free to expand or contract within the burner feed chamber, without being exposed to expansion and compression forces with respect to the burner feed chamber.

The metallic construction can comprise a plurality of metal bars, which may have a double T shaped cross-section.

Advantageously, the support rim comprises a plurality of metal support plates in the refractory brickwork of the combustion chamber for supporting the metallic construction. The metal support plates can be arranged so as to be moveably resting on the refractory brickwork of the combustion chamber. Preferably, the metal support plates are arranged in an interlocked configuration so as to resist tensile stress. The metal support plates can be bolted together.

The fuel container can be screwed to the metallic construction. This allows for the fuel container to be easily detached for maintenance or replacement if needed. It should however be noted that it is not excluded to connect the fuel container to the metallic construction in a more permanent manner, e.g. through welding.

According to one aspect of the invention, the fuel container comprises a plurality of metal sheet elements, which are preferably screwed together to form the fuel container. The fuel container can hence be constructed on site. Furthermore, the access to the burner feed chamber need not be as big as to fit the completed fuel container through. The access can be kept relatively small. Another advantage of such a construction is the fact that, should a portion of the fuel container be damaged, that portion can easily be detached for maintenance or replacement, without having to dismantle the whole ceramic burner.

Preferably, the metallic construction and/or the fuel container and/or an inlet duct of the fuel container are made from stainless steel.

According to a further embodiment of the invention, the ceramic burner may, in addition to the fuel container, comprise a metallic air container, the air container comprising the air chamber therein. Although the air container is not described in detail herein, it will be understood that it may comprise the same features as the fuel container, in particular concerning its construction and attachment within the burner feed chamber.

BRIEF DESCRIPTION OF THE DRAWINGS

The present invention will be more apparent from the following description of a not limiting embodiment with reference to the attached drawings. In these drawings, wherein identical reference numerals are used to indicate identical or similar elements.

DETAILED DESCRIPTION OF THE INVENTION

Figure 1:
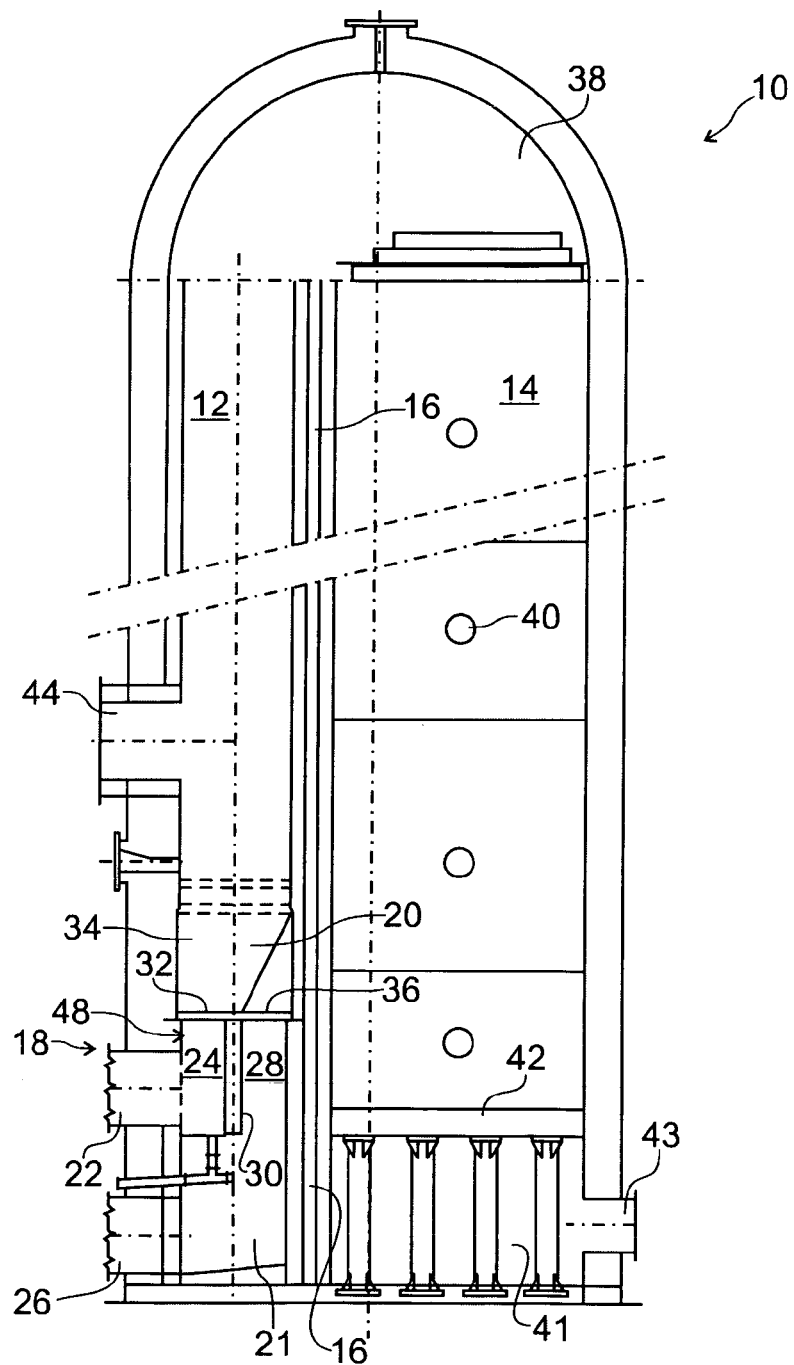
FIG. 1: is a schematic cut through a hot blast stove comprising a ceramic burner according to the invention.

FIG. 1 shows a cut through a typical hot blast stove 10, comprising a combustion chamber 12 and a heat-retention chamber 14 separated from one another by a wall 16 constructed from refractory bricks. In a bottom section 18 of the combustion chamber 12, a ceramic burner 20 is located. The ceramic burner 20 comprises a burner feed chamber 21 with a fuel inlet 22 for feeding combustible fuel, generally gas, to a fuel chamber 24 of the burner feed chamber 21 and an air inlet 26 for feeding combustion air to an air chamber 28 of the burner feed chamber 21. The fuel and air chambers 24, 28 are separated from each other by means of a partition wall 30. The fuel chamber 24 has a fuel outlet 32 opening up into a mixing zone 34. The air chamber 28 has an air outlet 36 also opening up into the mixing zone 34. In the mixing zone 34, the combustible fuel and the combustion air are mixed to form a combustible mixture, which is then burnt in the combustion chamber 12 of the hot blast stove 10.

During operation of the hot blast stove 10, combustible fuel and combustion air are fed to the ceramic burner 20 and the resulting combustible mixture is lit. The flue gases emanating from the combustion of the combustible mixture rise upwards in the combustion chamber 12, At the upper end of the combustion chamber 12, the hot flue gases enter a cupola 38 which diverts them into the heat-retention chamber 14 filled with checker bricks, schematically represented by reference sign 40. As the flue gases pass through the heat-retention chamber 14, the checker bricks 40 absorb heat from the flue gases. The checker bricks 40 are maintained in the heat-retention chamber 14 above an exhaust gas chamber 41 by means of a checker grid 42. The flue gasses, which have now cooled down escape the stove 10 via the exhaust gas chamber 41 through a discharge port 43.

Once the checker bricks 40 have been heated to a sufficiently high temperature, the supply of combustion air and fuel is discontinued and air is blown through the stove 10 in the opposite direction. This air is heated as it passes through the heat-retention chamber 14 containing the hot checker bricks 40. The heated air is then fed via the cupola 38 into the combustion chamber 12. The hot air finally leaves the combustion chamber 12 via a hot blast outlet 44 to be fed into a blast furnace (not shown).

According to an important aspect of the invention, the ceramic burner 20 comprises a gastight metallic fuel container 48, which is arranged in the burner feed chamber 21. A wall portion of the fuel container 48 forms the partition wall 30. The partition wall 30, which is metallic, forms a gastight barrier between the fuel and air chambers 24, 28, thereby preventing any gas from leaking from the fuel chamber 24 into the air chamber 28. More importantly, the gastight metallic fuel container 48 also avoids that gas can leak from the gas chamber 24 to the exhaust gas chamber 41 through the refractory brick wall 16.

Figure 2:
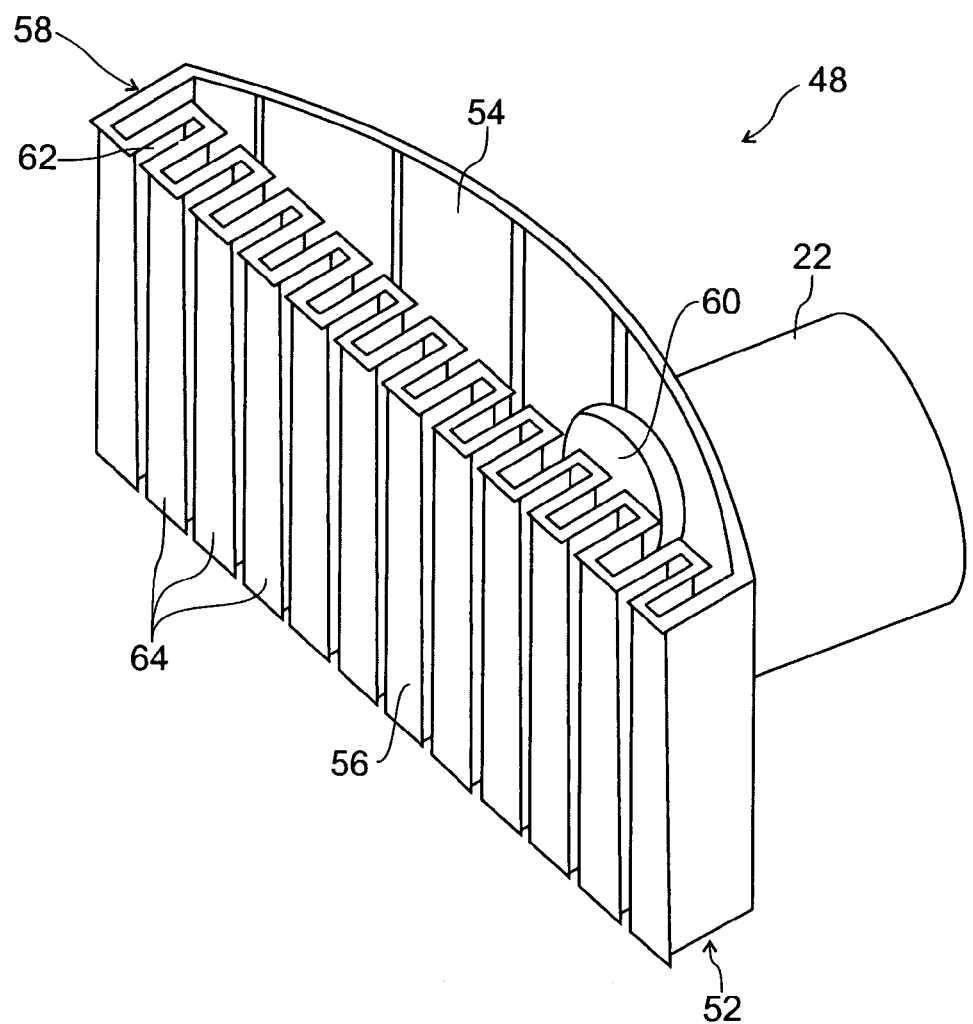
FIG. 2: is a perspective view of a fuel container of a ceramic burner according to the invention.
Figure 3:
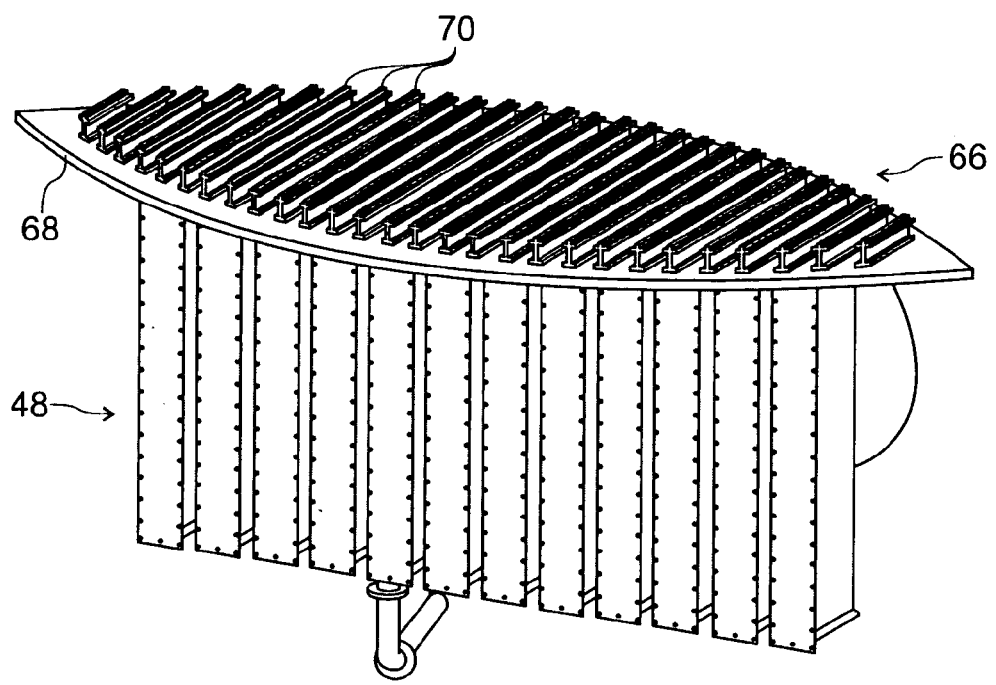
FIG. 3: is a perspective view of an assembly comprising the fuel container of FIG. 2 and a support structure for the fuel container.

The fuel container 48 can be more closely described by referring to FIGS. 2 and 3. The fuel container 48 comprises a base portion 52, a first wall portion 54 conforming to the side wall of the burner feed chamber 21, a second wall portion 56 forming the partition wall 30 and a top portion 58, the fuel chamber 24 being arranged in the fuel container 48. A first opening 60 is arranged in the first wall portion 54 for connecting to the fuel inlet 22. The top portion 58 comprises a second opening 62 for feeding fuel from the fuel container 48 to the mixing zone 34.

The second wall portion 56 is undulated such that, in the region of the second wall portion 56, alternate channels of air and fuel are led to the mixing zone 34. This provides good mixing conditions for the air and the fuel. As can be seen from FIG. 2, the second wall portion 56 is constructed from a plurality of metal sheet elements 64 which are connected together. The first wall portion 54 and the base portion 52 are preferably also constructed from such metal sheet elements 64. Such a construction, wherein the individual metal sheet elements 64 are connected together e.g. by means of screws, allows for the fuel container 48 to be assembled on-site within the burner feed chamber 21.

A further important aspect of the present invention can be illustrated by referring to FIG. 3 and concerns the connection of the fuel container 48 in the burner feed chamber 21. The burner feed chamber 21 is provided with a support rim (not shown) on which rests a metallic construction 66. The metallic construction 66 serves as support structure for the fuel container 48. The top portion 58 of the fuel container 48 is connected to the metallic construction 66 in such a way that the fuel container 48 is suspended from the metallic construction 66. The suspended arrangement of the fuel container 48 in the burner feed chamber 21 protects the latter from any expansion or compression forces due to the temperature difference. The life of the ceramic burner 20 is thereby prolonged.

The metallic construction 66 comprises metallic support plates 68 resting on the support rim and a plurality of metal bars 70 arranged in parallel and resting on the metallic support plates 68. The metal bars 70 may, as shown in FIG. 3, have a double T-shaped cross-section. The fuel container 48 can be connected to the metallic construction 66 by means of screws. The fuel and air coming from the fuel and air chambers 24, 28 pass between the metal bars 70 to reach the mixing zone 34.

The fuel container 48 and the metallic construction 66 are preferably made from stainless steel.

The invention claimed is:

1. Ceramic burner for use in a combustion chamber of a hot blast stove of a blast furnace, wherein the ceramic burner comprises:
   a burner feed chamber with a partition wall for dividing the burner feed chamber into a fuel chamber and an air chamber, the fuel chamber having a fuel inlet for receiving combustible fuel and a fuel outlet for feeding the combustible fuel to a mixing zone and the air chamber having an air inlet for receiving combustion air and an air outlet for feeding the combustion air to the mixing zone; and
   a gastight metallic fuel container arranged in the burner feed chamber, the fuel container comprising the fuel chamber therein, a wall portion of the fuel container forming the partition wall disposed between and being integral with the fuel chamber and the air chamber, the partition wall being undulated in a direction perpendicular to the fuel flow towards the mixing zone.

2. Ceramic burner according to claim 1, wherein the undulated partition wall forms fuel channels inside the fuel container and air channels outside the fuel container, the alternating fuel channels and air channels leading the combustible fuel and the combustion air to the mixing zone.

3. Ceramic burner according to claim 1, wherein the fuel container is suspended from a metallic construction resting on a support rim of the combustion chamber.

4. Ceramic burner according to claim 3, wherein the metallic construction comprises a plurality of metal bars.

5. Ceramic burner according to claim 4, wherein the metal bars have a double T shaped cross-section.

6. Ceramic burner according to claim 3, wherein the support rim comprises a plurality of metal support plates in the refractory brickwork of the combustion chamber for supporting the metallic construction.

7. Ceramic burner according to claim 6, wherein the metal support plates are arranged so as to be moveably resting on the refractory brickwork of the combustion chamber.

8. Ceramic burner according to claim 6, wherein the metal support plates are arranged in an interlocked configuration.

9. Ceramic burner according to claim 6, wherein the metal support plates are bolted together.

10. Ceramic burner according to claim 3, wherein the fuel container is screwed to the metallic construction.

11. Ceramic burner according to claim 1, wherein the fuel container comprises a plurality of metal sheet elements.

12. Ceramic burner according to claim 11, wherein said metal sheet elements are screwed together to form the fuel container.

13. Ceramic burner according to claim 1, wherein the metallic construction is made from stainless steel.

14. Ceramic burner according to claim 1, further comprising a metallic air container arranged in the burner feed chamber, the air container comprising the air chamber therein.

15. Ceramic burner according to claim 1, wherein the combustible fuel is a combustible gas.

16. Ceramic burner according to claim 1, wherein the fuel container is made from stainless steel.

17. Ceramic burner according to claim 1, wherein an inlet duct of the fuel container is made from stainless steel.

* * * * *